US009649586B2

(12) United States Patent
Buzanowski et al.

(10) Patent No.: US 9,649,586 B2
(45) Date of Patent: May 16, 2017

(54) APPARATUS AND METHODS FOR LARGE PARTICLE ASH SEPARATION FROM FLUE GAS USING SCREENS HAVING SEMI-ELLIPTICAL CYLINDER SURFACES

(71) Applicant: Integrated Global Services, Inc., Midlothian, VA (US)

(72) Inventors: Mark A. Buzanowski, Richmond, VA (US); Richard B. Crawford, Richmond, VA (US); Jake King, Powhatan, VA (US); Iain Stuart Hall, Midlothian, VA (US)

(73) Assignee: Integrated Global Services, Inc., Richmond, VA (US)

( * ) Notice: Subject to any disclaimer, the term of this patent is extended or adjusted under 35 U.S.C. 154(b) by 163 days.

(21) Appl. No.: 14/559,457

(22) Filed: Dec. 3, 2014

(65) Prior Publication Data

US 2015/0082983 A1    Mar. 26, 2015

Related U.S. Application Data

(62) Division of application No. 13/633,717, filed on Oct. 2, 2012, now Pat. No. 8,936,662.

(51) Int. Cl.
*B01D 46/10* (2006.01)
*B01D 39/10* (2006.01)
*F23J 3/04* (2006.01)

(52) U.S. Cl.
CPC .......... *B01D 46/103* (2013.01); *B01D 39/10* (2013.01); *F23J 3/04* (2013.01);
(Continued)

(58) Field of Classification Search
CPC .. B01D 46/103; B01D 39/10; B01D 2275/20; B01D 2275/206; B01D 2258/0283; F23J 3/04
See application file for complete search history.

(56) References Cited

U.S. PATENT DOCUMENTS 3,310,098 A    3/1967  Hardison
4,286,548 A    9/1981  Brash
(Continued)

FOREIGN PATENT DOCUMENTS

CN    1019920204 A    3/2011
CN     102179156 A    9/2011
(Continued)

OTHER PUBLICATIONS

Office Action issued for Chinese Application No. 201210444088.7, dated Jan. 12, 2015, 24 pages with English Language translation.
(Continued)

*Primary Examiner* — Robert Clemente
(74) *Attorney, Agent, or Firm* — Norton Rose Fulbright US LLP

(57) ABSTRACT

Apparatus for separating ash particles from a flue gas. The apparatus includes a screen that has a plurality of semi-elliptical cylinder surfaces. The semi-elliptical cylinder surfaces having holes through which said flue gas flows and through which the ash particles will not pass. The screen has a single layer for performing the separation in a manner such that the ash particles fall away from the screen and collect outside of the screen. A method of reducing velocity of a flue gas passing through screening apparatus for separating flue gas from ash particles. The method includes replacing a first screen of the screening apparatus with a second screen that has a plurality of semi-elliptical cylinder surfaces.

9 Claims, 8 Drawing Sheets

(52) U.S. Cl.
CPC .. *B01D 2258/0283* (2013.01); *B01D 2275/20* (2013.01); *B01D 2275/206* (2013.01); *Y10T 29/4973* (2015.01)

(56) References Cited

U.S. PATENT DOCUMENTS

| | | |
|---|---|---|
| 4,613,438 A | 9/1986 | DeGraffenreid |
| 4,652,286 A | 3/1987 | Kusuda et al. |
| 4,715,954 A | 12/1987 | DeGraffenreid |
| 4,749,485 A | 6/1988 | DeGraffenreid |
| 5,738,711 A | 4/1998 | Finnemore |
| 6,510,820 B1 | 1/2003 | McDonald |
| 6,916,353 B2 | 7/2005 | Tang |
| 6,994,036 B2 | 2/2006 | Grommes et al. |
| 7,077,069 B2 | 7/2006 | Oomura et al. |
| 7,100,521 B2 | 9/2006 | Ryan |
| 7,531,143 B2 | 5/2009 | Bruggendick et al. |
| 7,556,674 B2 | 7/2009 | Andersson |
| 7,625,417 B2 | 12/2009 | Yang |
| 8,062,600 B2 | 11/2011 | Bruggendick et al. |
| 2005/0061261 A1 | 3/2005 | Grommes et al. |
| 2011/0136567 A1 | 6/2011 | Bichl et al. |
| 2011/0173937 A1 | 7/2011 | Nelson |
| 2011/0186082 A1 | 8/2011 | Yonekawa |
| 2012/0036817 A1 | 2/2012 | Buzanowski |
| 2012/0073666 A1 | 3/2012 | Hjelmberg et al. |

FOREIGN PATENT DOCUMENTS

| | | |
|---|---|---|
| CN | 201110114613 | 11/2011 |
| CN | 201110198756 | 2/2012 |
| CN | 201120250534 | 5/2012 |
| CN | 201110338558 | 6/2012 |
| GB | 2441171 A | 2/2008 |

OTHER PUBLICATIONS

Anthony Ryan et al., "SCR System Design Considerations for 'Popcorn' Ash," Copyright 2003 by The Babcock & Wilcox Company, pp. 8.

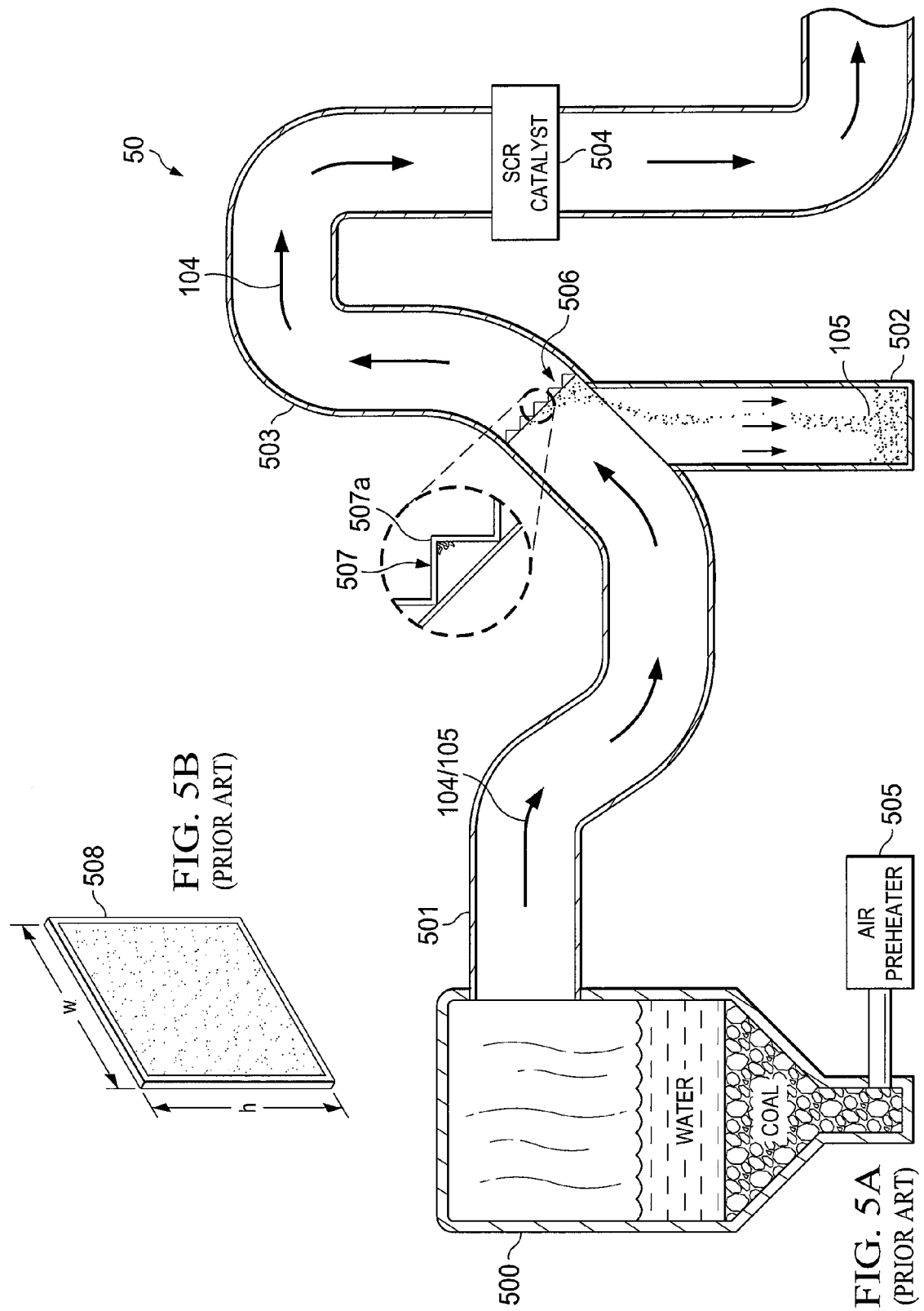

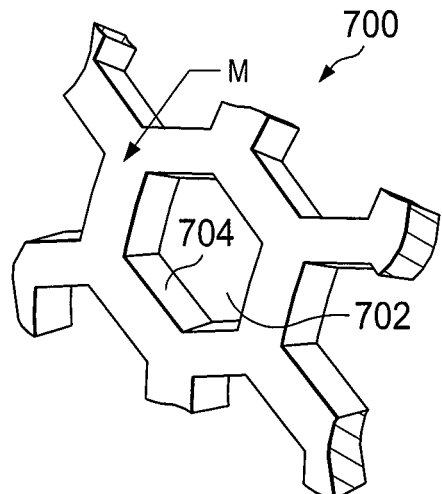
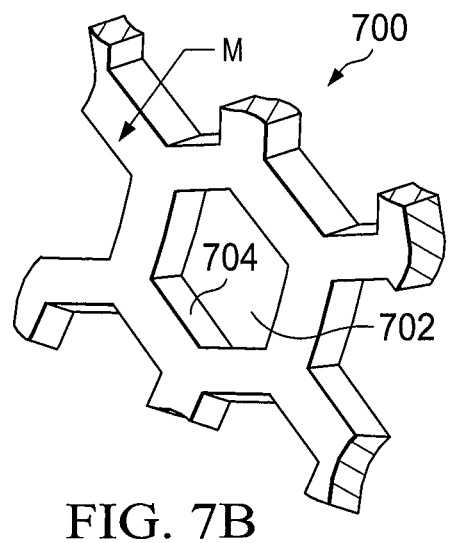
FIG. 7A  FIG. 7B
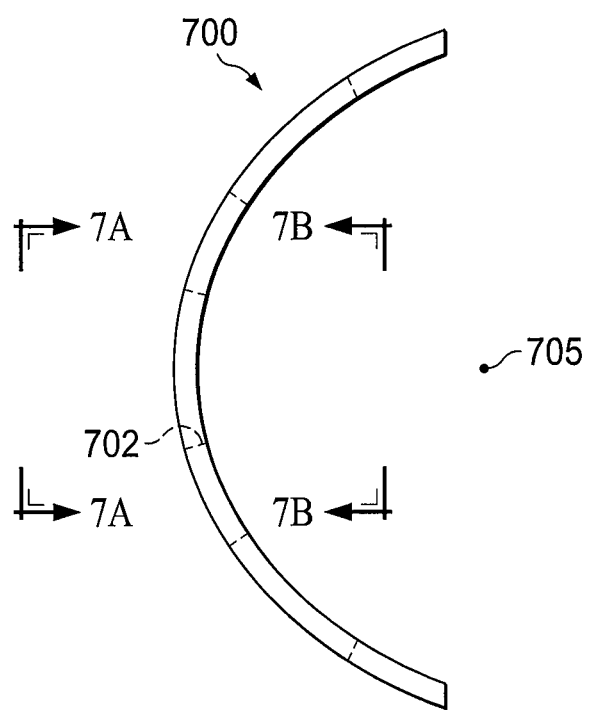
FIG. 7C

APPARATUS AND METHODS FOR LARGE PARTICLE ASH SEPARATION FROM FLUE GAS USING SCREENS HAVING SEMI-ELLIPTICAL CYLINDER SURFACES

CROSS-REFERENCE TO RELATED APPLICATIONS

This Application is a Divisional of U.S. patent application Ser. No. 13/633,717, entitled Apparatus and Methods for Large Particle Ash Separation From Flue Gas Using Screens Having Semi-Elliptical Cylinder Surfaces, filed Oct. 2, 2012, the disclosure of which is hereby incorporated herein by reference.

TECHNICAL FIELD

The present disclosure is related to the control of particulate emissions from industrial plants such as coal fired plants. More specifically, the present disclosure is related to the separation of large particle ash from flue gas utilizing screens.

BACKGROUND

Coal is a primary source of energy today and is commonly used as fuel to produce electricity. A byproduct of producing electricity in a coal combustion process is nitrous oxide (NOx), which is emitted with a flue gas from coal burning electrical generating plants. This nitrous oxide is considered a pollutant to the atmosphere. Catalytic reactors are used to address this type of pollution by reducing the nitrous oxide concentration in the flue gas. Ash is another byproduct of burning coal and typically comprises silicon dioxide, calcium oxide, carbon and many other constituents depending on the makeup of the coal being burned. The combustion ash particles are usually small (up to 300 micro meters in diameter) and usually suspended in the flue gas. However, the combustion ash particles can form large particle ash (LPA), which may have a diameter exceeding 1 centimeter. LPA formation can be traced to combustion conditions in the boiler and clay like fly ash deposits on superheater tubes and backpass. The catalytic reactors are equipped with a plate or honeycomb-type catalyst and may have a pitch or opening ranging up to 8 millimeters. LPA particles are larger than the catalyst opening and therefore clogs up the catalytic reactor. As such, methods for separating ash from flue gas have been developed.

For example, U.S. Pat. No. 7,531,143, entitled "Arrangement for separating coarse ash out of a flue gas stream," discloses screens with pleated arrangements for separating ash particles from flue gas. In practice, these screens experience blockage in certain areas of the pleated arrangement, which creates high velocity zones that cause damage to the screens. As a result, these pleated screens have to be replaced frequently or perform inefficiently and increase pressure drop in the system. It should also be noted that channels through which flue gas flows are large and, at least for this reason, screens used in these channels to separate ash from flue gas are also large and can be relatively costly.

U.S. Pat. No. 7,556,674, entitled "Method and device for the separation of dust particles," discloses a system involving a baffle arrangement for deflecting ash particles from the flue gas towards hoppers, which collect the ash particles. This system requires a long duct to settle out the ash particles. The length of the duct makes this system relatively expensive.

The pleated screen design and baffle arrangement utilizing gravimetric forces do not economically remove large particle ash. Another problem in the art is that the ash particles in the flue gas erode structural duct members and separation screens. High flue gas velocities combined with hard ash particles will lead to significant metal wastage of this equipment. In summary, existing systems and methods for screening ash particles from flue gas are associated with high operating costs and high capital expenditure.

BRIEF SUMMARY

The current disclosure is directed to apparatus and methods for separating ash particles from a flue gas using a screen having a plurality of semi-elliptical cylinder surfaces. According to embodiments, the semi-elliptical cylinder surfaces have holes through which the flue gas flows and through which the ash particles will not pass. The semi-elliptical cylinder shape ensures a uniform velocity profile at the screen surface. Further, the semi-elliptical cylinder shaped screen arrangement allows for the strategic exposure of the internal hole walls of the screen to the incoming ash and flue gas. Depending on the concave or convex configuration of the screen having semi-elliptical cylinder surfaces, more or less wall material is exposed to the ash particles. Furthermore, the semi-elliptical cylinder shaped screen arrangement increases the surface area of the screen and reduces flue gas velocity at the screen surface and overall pressure drop over the screen. Further yet, in embodiments, the semi-elliptical screen arrangement assures that a coated-surface of the screen is maximized in the concave position of the screen thus extending the utilization life of the screen material.

Embodiments of the disclosure include methods of reducing the velocity of a flue gas passing through screening apparatus used for separating flue gas from ash particles. The methods may include replacing a first screen of the screening apparatus with a second screen comprising a plurality of semi-elliptical cylinder surfaces. The semi-elliptical cylinder surfaces have holes through which the flue gas flows and through which the ash particles will not pass.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5A shows a prior art system for separating ash particles from flue gas;

FIG. 5B shows a prior art flat screen;

FIGS. 7A to 7C show a semi-elliptical cylinder surface according to embodiments of the disclosure.

DETAILED DESCRIPTION OF THE INVENTION

Figures 1A, 1B:
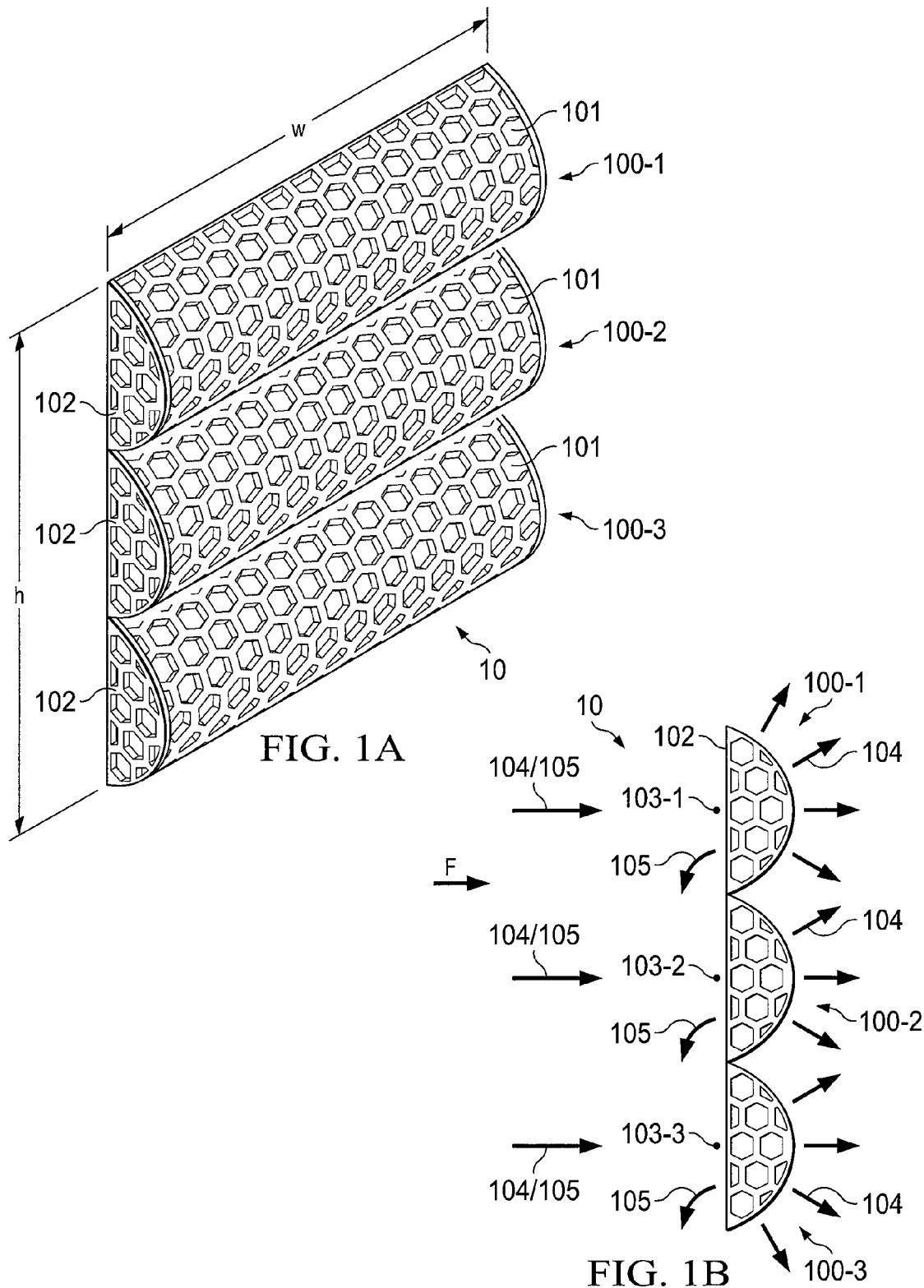
FIGS. 1A and 1B show a screen having a plurality of semi-elliptical cylinder surfaces according to embodiments of the disclosure.

FIG. 5A shows prior art system 50 for separating large ash particles from flue gas. Ash particles, as discussed herein are large and may be about 1-2 centimeters in diameter. System 50 represents a typical coal fired power plant boiler arrangement. At boiler 500, coal is mixed with air (from preheater 505) and burned. The burning coal causes an increase in temperature in boiler 500 such that water injected into boiler 500 is vaporized to steam. As mentioned above, the burning coal produces ash particles 105, which flows with hot flue gas 104 through duct 501. Duct 501 leads to screen 506. Screen 506 has holes having a diameter such that flue gas is allowed to pass through screen 506. However, at least some ash particles are too big to pass through the holes of screen 506. Because these ash particles are too big to pass through the holes of screen 506, they accumulate in hopper 502. Flue gas passes through screen 506 and enters duct 503. Duct 503 channels flue gas 104 to Selective Catalytic Reduction (SCR) Catalyst 504, which removes nitrous oxide from flue gas 104. The flue gas 104 leaving SCR Catalyst 504 may then be discharged into the atmosphere or cleaned further before discharge into the atmosphere.

Screen 506 is a pleated screen as known in the art and described for example, in U.S. Pat. No. 7,531,143. After screen 506 has been in operation for some time, ash particulate matter lodges in section 507a of pleat 507 and blocks that section. This blockage may cause the flue gas to flow through triangular pleat 507 at a non-uniform velocity. This non-uniform velocity can cause deterioration of screen material and rupturing of the screen. When this happens, particulate matter that should be screened passes through screen 506.

Screens that are essentially flat panels, such as flat screen 508 shown in FIG. 5B, do not have the problem described above with respect to pleated screens. However, flat panel screens, such as flat screen 508, causes a high pressure drop in the order of 0.5 to 1 inch water column, as flue gas passes through it. This high pressure drop is consistent with the high velocity at which flue gas flows through flat screen 508.

FIGS. 1A-3B show screens having a plurality of semi-elliptical cylinder surfaces according to embodiments of the disclosure. FIG. 1A shows screen 10 having semi-elliptical cylinder surfaces 100-1 to 100-3. In embodiments, screen 10 is made from a single layer of material such as metal, plastic, composites and combinations thereof. Semi-elliptical cylinder surfaces 100-1 to 100-3 have holes 101 that allow flue gas 104 to flow through screen 10 but does not allow ash particles 105 to flow through screen 10. That is, ash particles 105 have a cross sectional area or a diameter that is greater than the cross sectional area or diameter of holes 101, respectively. In embodiments, holes 101 have a cross sectional area of about 1 mm²-200 mm². Whatever the size of holes 101, ash particles 105 are larger than holes 101. It should be noted that, in practice, some ash particles are small enough to pass through, and do pass through, holes 101.

The flow of flue gas/ash particles mixture 104/105 to semi-elliptical cylinder surfaces 100-1 to 100-3 and the screening of ash particles 105 do not cause a buildup of ash particles, as occurs with respect to pleat 507 of screen 506. For instance, screen 10 does not have an "apex shaped portion"—section 507a that traps large ash particles. Furthermore, when ash particles 105 hit screen 10, screen 10's elliptical shape cause ash particles 105 to fall away from screen 10 under the influence of gravitational forces. In other words, screens as disclosed herein are designed to block the flow of large particle ash in a manner such that the ash particles collect in or on other equipment apart from the screens. This is unlike filters, which are designed to trap particulates within the filter itself. Referring again to FIG. 1A, ash particles 105 are collected away from screen 10 in, for example, a hopper. Because screen 10 is not designed to have a buildup of ash particles 105 on it, the velocity of flue gas across semi-elliptical cylinder surfaces 100-1 to 100-3 (and screen 10 as a whole) is uniform.

In addition to not being susceptible to blockages, the shape of semi-elliptical cylinder surfaces 100-1 to 100-3 reduce the velocity of flue gas 104 by increasing the surface area of the screen as compared with the surface area of flat screen 508. The pressure drop may be calculated from the following formula:

$$\Delta P = fv^2$$

where f=friction factor and v=the velocity of the flue gas
In embodiments of the disclosure, screen 10 may also include screen side sections 102. Sections 102 may also have holes 101 for separating ash particles 105 from flue gas 104. In embodiments, screen side sections 102 may be a solid plate without holes.

As can be seen from FIG. 1B, semi-elliptical cylinder surfaces 100-1 to 100-3 have foci points 103-1 to 103-3 respectively. The foci points are the points representing the focal line, based on the elliptical shape, at which light rays would focus (or substantially focus) when the semi-elliptical surfaces are exposed to light if semi-elliptical cylinder surfaces 100-1 to 100-3 are reflective. It should be noted, however, that this disclosure does not require reflective surfaces, which is mentioned here only to explain what is meant by focal point in the context of elliptical shapes. Semi-elliptical cylinder surfaces 100-1 to 100-3 may be any type of ellipse (e.g. a circle or a parabolic ellipse). The type of ellipse will determine the exact location of foci points 103-1 to 103-3. Notably, in the embodiment shown in FIGS. 1A and 1B, flow direction F of flue gas/ash particular mixture 104/105 is from the side of screen 10 on which foci points 103-1 to 103-3 lie. In other words, FIGS. 1A and 1B show a concave configuration.

Figure 2A:
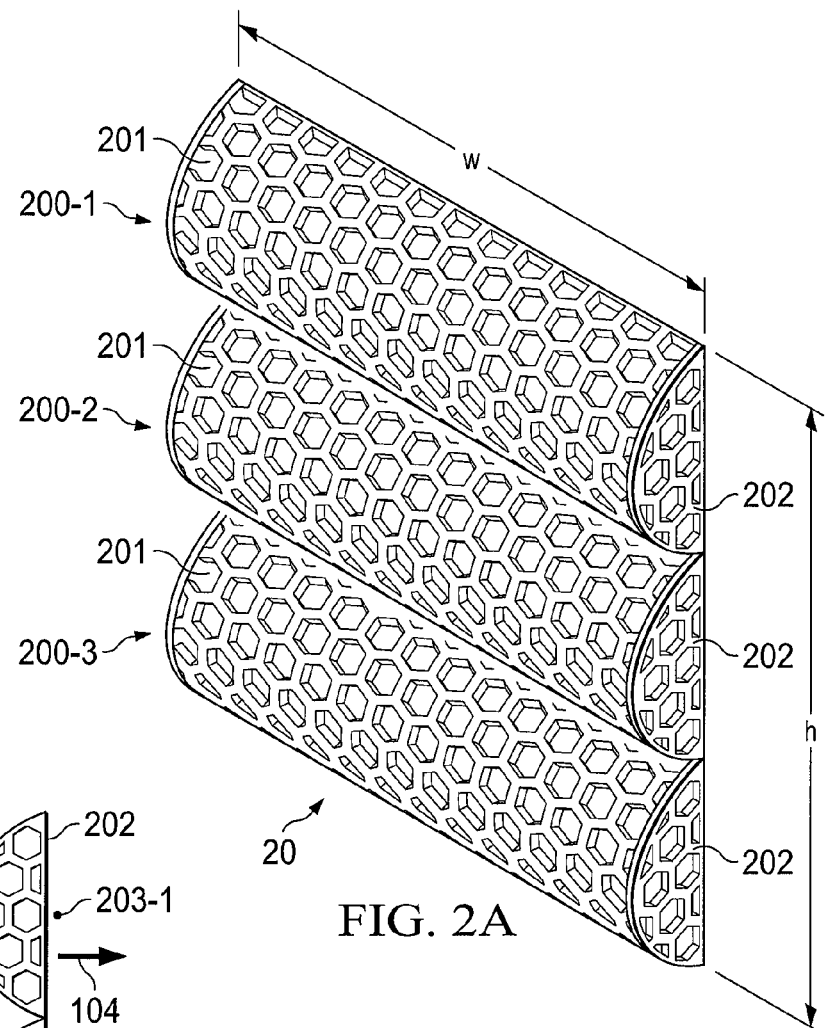
FIGS. 2A and 2B show a screen having a plurality of semi-elliptical cylinder surfaces according to embodiments of the disclosure.
Figure 2B:
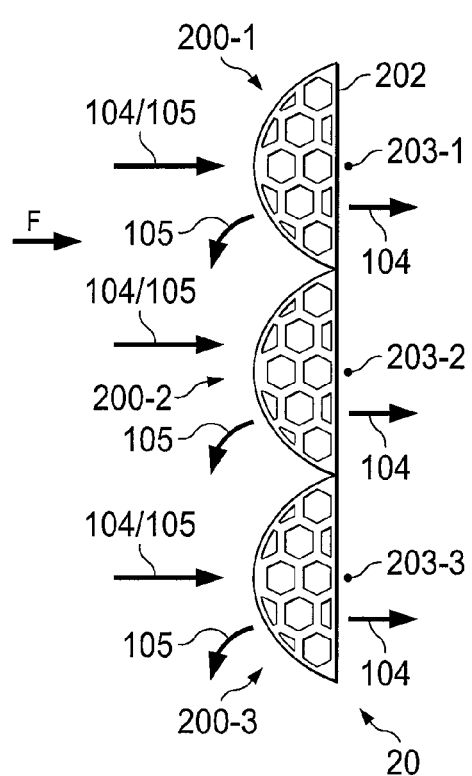

Screen 20 have the features of screen 10, except that, as shown in FIGS. 2A and 2B, screen 20 has semi-elliptical cylinder surfaces 200-1 to 200-3 with a convex configuration because foci points 203-1 to 203-3 are on the opposite side of flow F (i.e. flow of flue gas/ash particle mixture 104/105). The semi-elliptical convex shaped surfaces of screen 20 are also not prone to blockages (thereby facilitating uniform velocity distribution of flue gas 104) and has a higher surface area than flat screen 508 (assuming screen 508 has the same perimeter as screen 20). The higher surface area of screen 20 reduces flue gas velocity as compared with flat screen 508. The perimeter of the screens illustrated herein is 2h +2w, where h is the height and w is the width of the screens as illustrated in FIGS. 1A, 2A and 5B. For purposes of discussion and comparison, all the screens described herein are assumed to have the same perimeter. In embodiments of the disclosure, screen 20 may also include screen side sections 202. Sections 202 may also have holes 201 for separating ash particles 105 from flue gas 104. In embodiments, screen side sections 202 may be a solid plate without holes. It should be noted that any number of sides 202 may have holes or may be a solid plate without holes. In embodiments, holes 201 have a cross sectional area of about 1 mm²-200 mm².

Figure 3A:
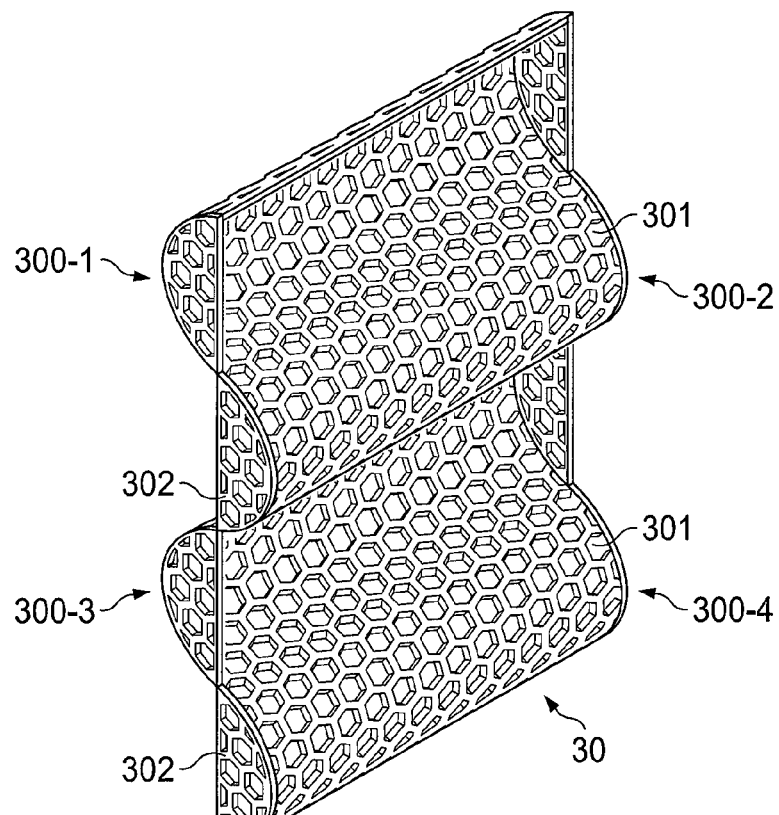
FIGS. 3A and 3B show a screen having a plurality of semi-elliptical cylinder surfaces according to embodiments of the disclosure.
Figure 3B:
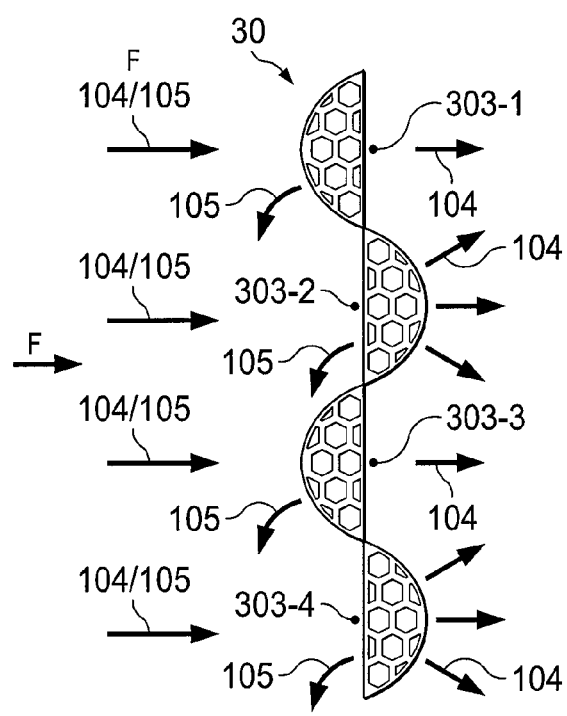

Screen 30, shown in FIGS. 3A and 3B, is a combination of the features of screen 10 (FIGS. 1A to 1B) with the features of screen 20 (FIGS. 2A and 2B). FIGS. 3A and 3B show screen 30 having semi-elliptical cylinder surfaces 300-1 to 300-4. Screen 30 has both concave and convex semi-elliptical cylinder surfaces. As shown in FIG. 3B, semi-elliptical cylinder surfaces 300-1 to 300-4 have foci points 303-1 to 303-4 respectively, which are on different sides of flow F (i.e. flue gas/ash particle mixture 104/105). Semi-elliptical cylinder surfaces 300-1 to 300-4 have holes 301 that allow flue gas 104 to flow through screen 30 but does not allow ash particles 105 to flow through screen 30. That is, ash particles 105 have a cross sectional area or a diameter that is greater than the cross sectional area or diameter of holes 301, respectively.

Again, screens with semi-elliptical surfaces in concave and convex orientation are not prone to blockages and facilitate uniform velocity distribution of flue gas 104. Further, the surface area of screen 30 is relatively larger than the surface area of flat screen 508, of screen 10 and of screen 20, which all have the same perimeter. This larger surface area of screen 30 increases flue gas velocity as compared to flat screen 508, screen 10 and screen 20. In embodiments of the disclosure, screen 30 may also include screen side sections 302. Sections 302 may also have holes 301 for separating ash particles 105 from flue gas 104. In embodiments, screen side sections 302 may be a solid plate without holes. In embodiments, holes 301 have a cross sectional area of about 1 mm²-200 mm².

Figure 4:
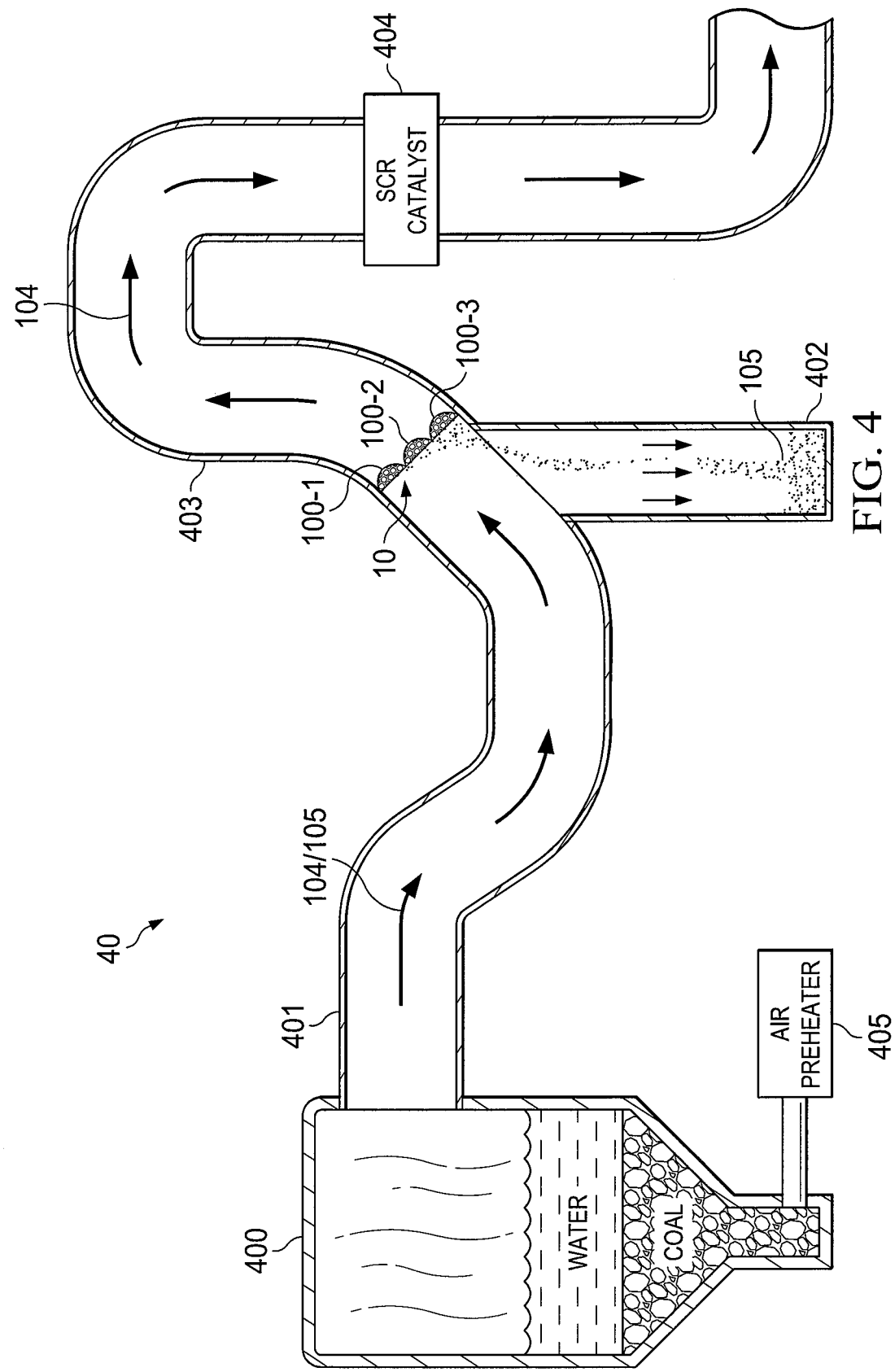
FIG. 4 shows a system for separating ash particles from flue gas according to embodiments of the disclosure.

FIG. 4 shows a system for separating ash particles from flue gas according to embodiments of the disclosure. System 40 shows a coal fired power plant boiler arrangement. Boiler 400 (using air from preheater 405) burns coal to produce steam as described above with respect to boiler 500. The ash produced by burning the coal flows with hot flue gas (as mixture 104/105) through duct section 401. Duct section 401 leads to screen 10. Screen 10 is located across the lumen of duct section 401 such that flue gas 104 has to pass through screen 10 to enter duct section 403. In other words, screen 10 extends from wall to wall of the duct (401 and 403) such that there is screening across all of the lumen of the duct.

As described above, screen 10 has semi-elliptical cylinder surfaces 100-1 to 100-3. Holes 101 of screen 10 have a diameter or cross sectional area such that flue gas 104 is allowed to pass through screen 10 but ash particles 105 are too big to pass through holes 101 of screen 10. Because ash particles 105 are too big to pass through holes 101, ash particles 105 fall away from screen 10 and accumulate in hopper 402. At the same time, flue gas 104 passes through screen 10 into duct section 403, which channels flue gas 104 to SCR Catalyst 404 (a destination equipment). SCR Catalyst 404 removes nitrous oxide from the flue gas. Flue gas 104 is then discharged into the atmosphere or cleaned further before discharge into the atmosphere. In embodiments, screens 20 and 30 can be used in system 40 instead of screen 10 or in addition to screen 10. Any combination of screens 10, 20 or 30 may be used in embodiments of the disclosure. Furthermore, screens 10, 20 and 30 may be used in a system that includes other types of separation equipment, such as baffle arrangements, deflector plates, other types of screens and the like.

According to embodiments of the disclosure, the pressure drop in large ash particle separator systems may be reduced by using the screen designs disclosed herein. For instance, flue gas velocity may be reduced by replacing a flat screen or a pleated screen, in the separator system (such as the system shown in FIG. 5), with a screen that includes a plurality of semi-elliptical cylinder surfaces, such as screens 10, 20, 30 or combinations thereof. In embodiments, this change can produce a reduction in flue gas velocity of about up to 20 percent and a reduction of pressure drop of about 40 percent. In embodiments, this change can produce a reduction in flue gas velocity of about up to 40 percent and a reduction of pressure drop of about 60 percent. In embodiments, the screens as disclosed herein may be used to replace separation systems such as baffle based systems, deflector based systems, prior art screen systems and the like.

Figure 6A:
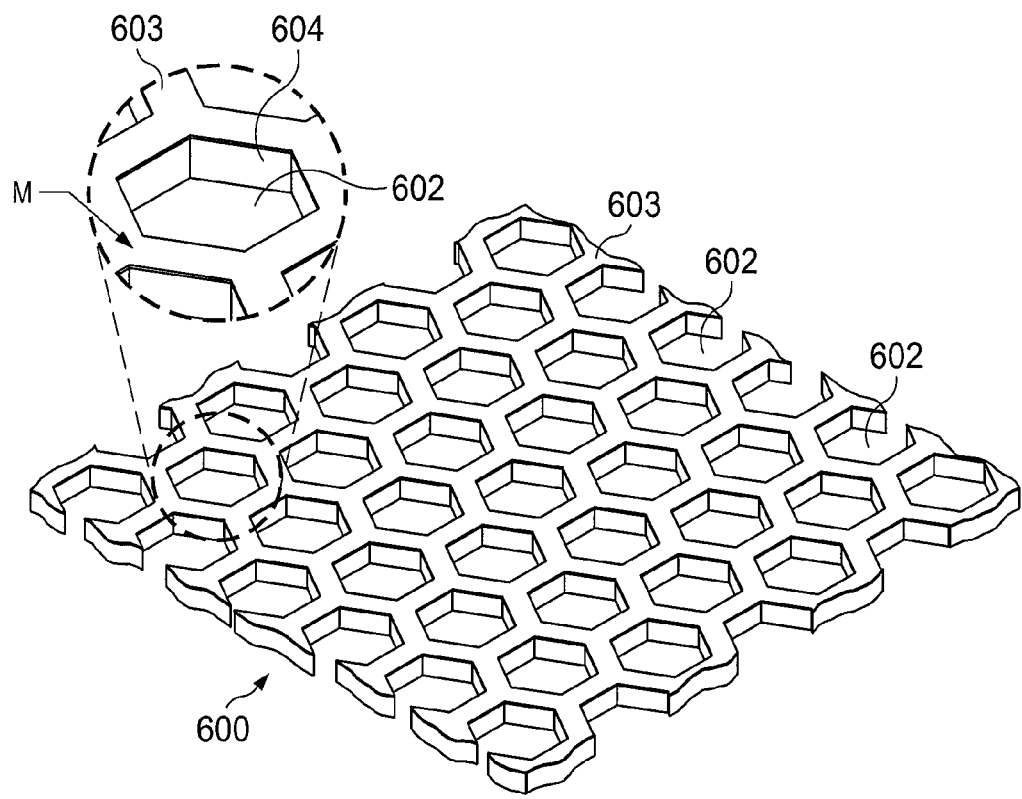
FIGS. 6A and 6B show flat screens.
Figure 6B:
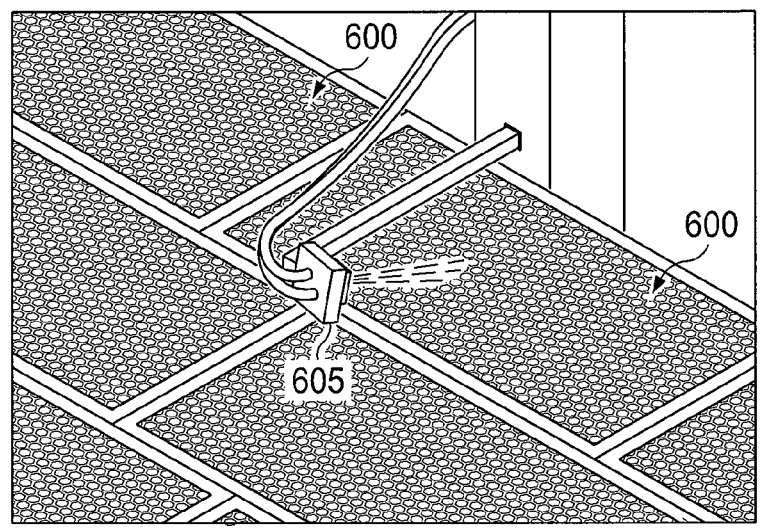

FIGS. 6A and 6B show flat screens 600. Flat screen 600 includes hexagonal shaped holes 602, formed by material M. Material M is typically a metal such as iron, aluminum, steel and the like. However, material M could also be plastic, ceramic composites and the like. When ash particles hit material M of screen 600, they erode material M. In order for material to withstand the effect of processes (such as abrasion) brought about by ash particles hitting material M and the flow of flue gas 104 and particles (that are small enough) through holes 602, material M may be specially formulated or coated with other substances so that it is resistant to these impacts. Specially formulating or coating material M extends the life of screen 600. Material M has top section 603 and internal section 604. Coating top sections 603 can be done easily using a spraying device because these sections are fully exposed. Internal section 604, however, has to be coated by the use of a spray device at an angle. For example, spray device 605, as shown in FIG. 6B, is positioned in a manner such that when material M is sprayed with appropriate coating, the coating contacts section 604.

FIGS. 7A to 7C show screen 700 according to embodiments of the disclosure. Screen 700, may also be made of material M and may have a similar hexagonal structure as screen 600. However, in screen 700, these hexagonal structures are in an elliptical cylindrical surface. When ash particles hit material M of screen 600, they erode material M. To reduce this erosion, high efficiency ash removal systems must ensure uniform flow conditions as well as use high performance erosion resistant surface treatments. Like screen 600, material M of screen 700 may be specially formulated or coated with other substances so that it is resistant to these impacts. Specially formulating or coating material M extends the life of screen 700. The coating material may include ceramic metal composite.

FIG. 7C shows screen 700 and the views that FIGS. 7A and 7B represent. FIG. 7B is a view from the side where focal point 705 is located while FIG. 7A is a view from the opposite side. Screen 700 has holes 702, which are similar to holes 602 shown in FIGS. 6A and 6B. In screen 700 (FIG. 7A), however, internal sections 704 are more exposed than internal sections 604 because the bending of screen 700 into the semi-elliptical cylinder shape pushes internal surface 704 outwards. In this way, screen 700 presents a configuration in which it is much easier to coat internal sections 704 with a selected coating material than coating sections 604.

FIG. 7B shows screen 700 from the side of focal point 705. That is, internal sections 704 are less exposed than internal sections 604. Thus, if screen 700 is used in the concave configuration (i.e. flow of flue gas is from the side on which focal point 705 is located) less of internal sections 704 are exposed as compared to internal sections 604. Thus, in addition to making it easier to coat internal surfaces, configuring screens to have semi-elliptical cylinder surfaces can decrease the surface area that will be exposed to the effects of abrasion from ash particles hitting screen 700. Consequently, in the concave configuration shown in FIG. 7B, it might not be necessary to provide any or as much coating of internal sections 704 as compared to the internal coating needed for internal sections 604.

Therefore, for different applications of ash separation, a determination may be made as to which of the concave or convex semi-elliptical cylinder designs is more efficient. For example, a determination may be made whether the reduction in cost due to the ease of coating internal sections 704 outweighs the increased exposure of internal section 704 if screen 700 is used in a convex configuration. In sum, screens with semi-elliptical cylinder surfaces provide flexibility in designing screen separating systems.

The screens disclosed herein offer plants (that separate ash particles from flue gas) much more versatility in designing flue gas/ash particle separation systems as compared to traditional screens (e.g. flat screens) and other separation mechanisms. For instance, by changing a flat screen of a particular perimeter to a screen with semi-elliptical cylinder surfaces and the same perimeter as the flat screen, one can change the screen surface area exposed to the flue gas/ash particle mixture.

Figure 8A:
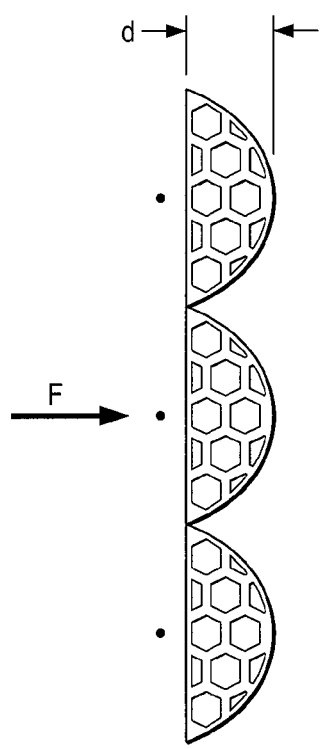
FIGS. 8A to 8C show screens according to embodiments of the disclosure.
Figure 8B:
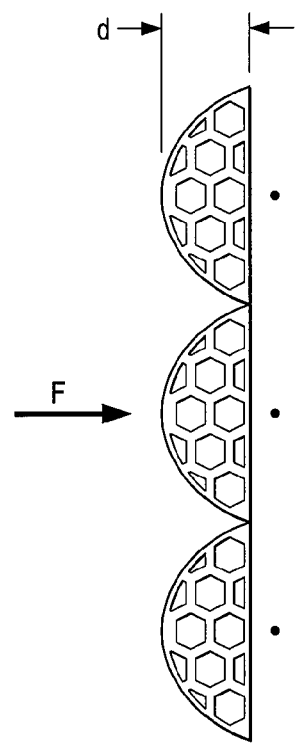
Figure 8C:
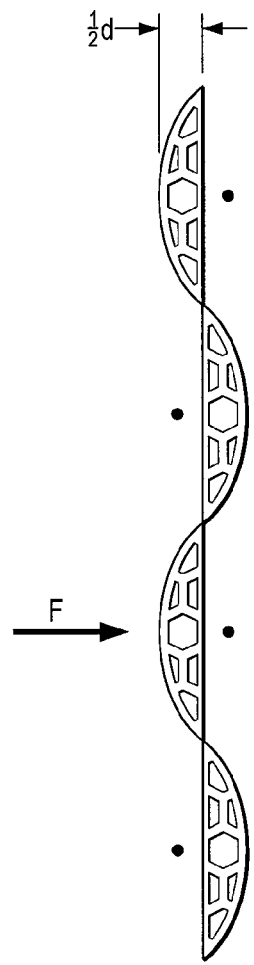

Screens having both concave and convex semi-elliptical cylinder surfaces provide a further benefit in the art. Specifically, in order to achieve a particular surface area of screen, less depth is required for screens with both concave and convex semi-elliptical cylinder surfaces. This feature is illustrated by comparing FIGS. 8A and 8B with FIG. 8C. FIGS. 8A and 8B show concave and convex orientation screens with depth distance "d". FIG. 8C shows a screen with both concave and convex orientation with depth "½d." Thus, FIG. 8C provides the same surface area as FIGS. 8A and 8B with half the depth.

In sum, embodiments of the disclosure involves screens that are longer lasting and operates at a lower pressure drop, at lower velocity for the flue gas and with more uniform velocity distribution of the flue gas. Further, embodiments of the screens disclosed offers more versatility as compared to traditional screens.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of separating ash particles from a flue gas, said method comprising:
    flowing a flue gas and ash particle mixture from a boiler via a duct to a screen having a plurality of semi-elliptical cylinder surfaces, said semi-elliptical cylinder surfaces having holes through which said flue gas flows and through which said ash particles will not pass, said screen having a single layer for performing said separating in a manner such that said ash particles fall away from said screen and collect outside of said screen, said screen being disposed in said duct's lumen such that flue gas flows through said screen to a destination equipment via said duct.

2. The method of claim 1 wherein said flue gas is flowed from a side of said screen on which foci points of said semi-elliptical cylinder surfaces lie.

3. The method of claim 1 wherein said flue gas is flowed from an opposite side of said screen on which foci points of said semi-elliptical cylinder surfaces lie.

4. The method of claim 1 wherein said flue gas is flowed from a side of said screen that has foci points of some of said plurality of semi-elliptical cylinder surfaces to a side of said screen that has foci points of other of said plurality of semi-elliptical cylinder surfaces.

5. The method of claim 1 further comprising:
    flowing said flue gas and ash particle mixture through a side section of each semi-elliptical cylinder surface, said side section having holes through which said flue gas flows and through which said ash particles will not pass.

6. The method of claim 1 wherein said holes of said screen comprises a cross sectional area of about 1 mm$^2$-200 mm$^2$.

7. The method of claim 1 further comprising:
    collecting said separated ash particles in a hopper.

8. The method of claim 1 further comprising:
    after said separation, discharging said flue gas into the atmosphere.

9. The method of claim 1 further comprising:
    after said separation, cleaning said flue gas further; and discharging said cleaned flue gas to the atmosphere.

* * * * *